United States Patent [19]

Armstrong

[11] Patent Number: 4,499,567

[45] Date of Patent: Feb. 12, 1985

[54] RADIO ACTUATED RECORD CONTROLLER DEVICE

[76] Inventor: Carl R. Armstrong, 426 W. 3rd St., Apt. 1E, Connersville, Ind. 47331

[21] Appl. No.: 390,164

[22] Filed: Jun. 21, 1982

[51] Int. Cl.[3] .................................. H04B 1/00

[52] U.S. Cl. .................................. 369/7; 340/311.1; 340/825.44

[58] Field of Search .................... 179/6.01, 6.13, 6.16, 179/2 EC; 340/311.1, 825.44, 825.47, 825.48; 455/344, 31, 18; 369/7

[56] References Cited

U.S. PATENT DOCUMENTS

| | | | |
|---|---|---|---|
| 3,699,443 | 10/1972 | Weger | 455/18 |
| 3,723,876 | 3/1973 | Seaborn, Jr. | 455/18 |
| 4,107,611 | 8/1978 | Holcomb et al. | 455/18 |
| 4,197,497 | 4/1980 | Phelps | 455/18 |
| 4,197,526 | 4/1980 | Levine et al. | 340/825.44 |
| 4,356,519 | 10/1982 | Cogdell, Jr. | 340/825.44 |

*Primary Examiner*—Donald McElheny, Jr.
*Attorney, Agent, or Firm*—Cullen, Sloman, Cantor, Grauer, Scott & Rutherford

[57] ABSTRACT

A message recording controller for use with a radio frequency actuated paging subscriber system of the type wherein a plurality of portable pagers are each operative to receive a voice message on a time shared based with the other portable pagers. After transmission of an alert or beeper tone to actuate a specific portable pager, a message is transmitted. The message recording control system of the present invention includes first and second timers which have different timing intervals. The system operates a tape recorder which is turned off and on by the second timer. The alert tone causes the system to trigger both of the timers on at the same time thus permitting the transmitted message to be recorded on the tape recorder. The second timer, which has a time interval corresponding to the maximum allowed time for transmission of messages, times out and shuts off the tape recorder at the end of its timing interval. A short time thereafter, the first timer, which has a slightly greater timing interval than the second timer, times out and resets the message recording controller to its stand-by position. The system provides a locked in message record period during which time a message is being recorded and during which time false triggering of the system is precluded.

3 Claims, 3 Drawing Figures

RADIO ACTUATED RECORD CONTROLLER DEVICE

BACKGROUND OF THE INVENTION

Portable pagers or receivers for use with radio paging systems are well-known. In a typical system the persons who are to be selectively paged each carry a portable pager and each pager is actuated in response to a unique coded signal—a unique signal is associated with each pager—identified as an "address". To actuate a particular pager, a well-known technique involves the use of telephones. The person who desires to do the paging dials a first number which connects such person by a telephone trunk line to a common carrier company. The common carrier company is connected by a telephone line to a terminal and the carrier company transmits a signal to the proper "address" such as by a unique signal which has a coded tone sequence such as two tones on an RF carrier. When the desired pager receives its unique coded signal, the pager will normally provide an alert tone in the form of a beep or other audible and/or visible indication so that the person carrying the pager is alerted that a voice message will be transmitted to them via their pager.

Such voice pagers represent a considerable improvement over prior art systems which transmit only a beeping tone. In response to the beeping tone, the person carrying the paging device must place a telephone call to an office, answering service, or the like to obtain a message. It has been found, however, that voice message pager systems still present a problem (which problem is common to the systems which transmit only a beeping tone), namely, that such systems require the pager to be carried at all times. This requirement has resulted in a pager being referred to as an "electronic leash".

Another problem encountered with the use of a voice message pager is that if the pager is used in high background noise areas such as factories, stores, at sporting events, etc., the voice message will be partially or completely inaudible.

A related problem encountered with the use of a voice message pager is that the person carrying the pager may be at a location where they do not wish to be interrupted such as during business meetings, during meals, or in certain public places, yet they do want to obtain all their messages.

Still another problem with the use of voice message pagers is that the message may contain information of a confidential business nature which the person carrying the pager does not wish to be overheard by those in the immediate vicinity. That is, although the RF transmitted message may obviously be overheard by anyone monitoring the specific frequency, the message may be meaningful only to the intended recipient and those in the immediate geographic vicinity of the intended recipient.

Voice message pagers normally have a reset mechanism such as a bar or button which must be actuated to clear the pager at the conclusion of the message so that the pager returns to the stand-by mode. A problem with these prior art pagers is that if the reset mechanism is accidentally depressed while a message is being transmitted, that part of the message which has not yet been transmitted will not be received by the pager.

Another problem with prior art paging devices is that they require an operator to manually reset the pager so that the pager converts to a stand-by mode to receive the next message. If the pager is not reset, the pager will continue in a "play" mode, thus draining the batteries.

Thus, the present invention relates to an improved paging system of the voice message radio transmitted type which provides a new approach to the reception of voice messages.

SUMMARY OF THE INVENTION

The present invention contemplates an improved voice message portable paging system wherein a message record controller system is provided to be used in conjunction with the pager. The system actuates a recorder to record those voice messages transmitted by a radio common carrier after the unique coded signal is received by the pager. Typically, the common carrier transmits messages on a time shared basis with each message not to exceed a time interval, for example, thirteen seconds. After the thirteen second message time interval elapses, a different message may be transmitted to the same or to a different portable paging unit.

The pager is initially in a stand-by condition. A predetermined address coded RF carrier alert signal is transmitted in a tone sequential system so that only the correct portable pager will receive the signal. When the pager receives the correct coded signal, the pager alert signal is coupled to a first timer of the control system of the present invention. The timer is paired with a second timer with the two timers having different time intervals or time constants. The alert input signal triggers the first timer which in turn triggers the second timer so that both timers are triggered from a quiescent or stand-by mode to an active cycling mode at essentially the same time. The first timer has a longer time interval than the second timer and thus there is a predetermined time lapse between the end of the second timer timing interval and the end of the first timer timing interval.

The primary function of the second timer, via logic means to be explained hereinafter, is to turn on the message recorder for the full interval that the second timer is on, which interval is pre-set to equal the message transmission time period allotted by the radio common carrier company. The logic means also energizes a relay so that no other input signal to the first timer, during the interval that the second timer is timing, will re-trigger the system. This prevents loss of parts of messages. At the completion of the second timer interval, the output of the second timer changes causing the relay to de-energize. This resets the pager to its stand-by mode. Then, for a predetermined time lapse, on the order of one second in the present form of the invention, the first timer continues in its timed cycle. While the first timer is still timing, including during the lapse after the second timer has timed out, the first timer cannot be re-triggered by an alert signal. Thus, once the first timer starts, it cannot be retriggered or falsely triggered. At the completion of the time lapse interval, the first timer returns to its stand-by mode to wait for another alert signal from the pager.

It is another object of the present invention to provide a control system for portable radio pagers wherein the pager can be readily connected by a control system to a message recording means for recording a series of messages which are transmitted to the pager such that the operator of the paging system may, at a later time, play back all of the messages which have been automatically recorded by means of the control system of the present invention.

It is still another object of the present invention to provide a control system which may be left at a remote location and will receive and automatically record voice messages which might have been difficult or inaudible for a person to receive and comprehend in a high noise area because of the level of noise.

It is a further object of the present invention to provide a control system for a portable voice pager wherein the pager receives and automatically records messages for playback at a later time.

Yet another object of the present invention is the provision of a control system which permits a voice pager to be useful a full 24 hours per day regardless of whether or not the person to be paged is physically carrying the pager.

BRIEF DESCRIPTION OF THE DRAWINGS

The foregoing objects and advantages of the present invention, together with other objects and advantages which may be attained by its use, will become more apparent upon reading the following detailed description of the invention taken in conjunction with the drawings.

In the drawings, wherein like reference numerals identify corresponding components.

DETAILED DESCRIPTION OF THE INVENTION

Figure 1:
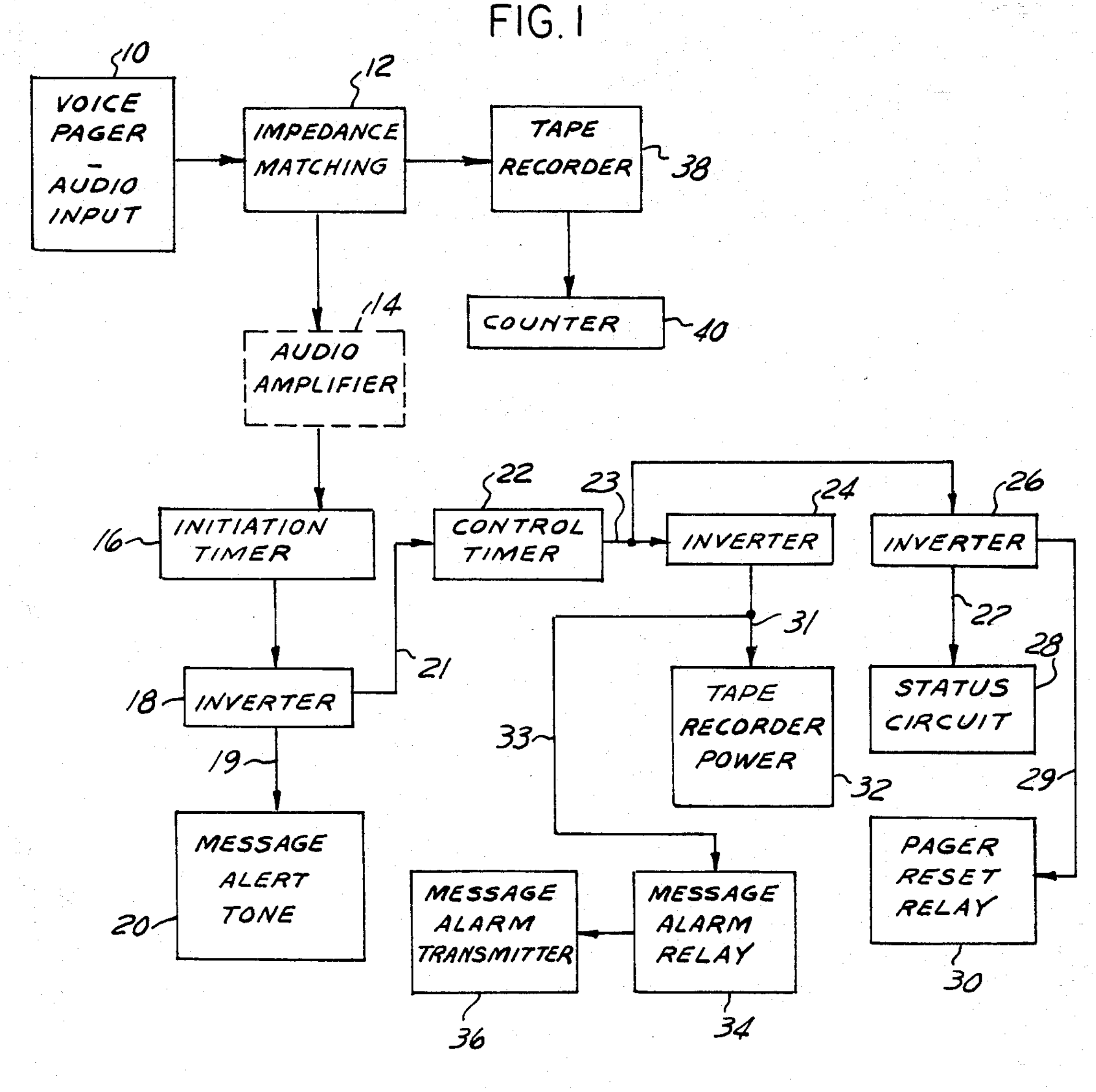
FIG. 1 is a block diagram illustrating the main components of the present invention.

Referring to the drawings and particularly to FIG. 1, the present invention is illustrated in block diagram form. The present system is designed to be used with a portable voice or pocket receiver radio pager 10 of a known standard type designed to operate on battery power. An example of one such radio pager is sold by Motorola, Inc. under the designation "Spirit" and when the pager 10 is on, the normal mode of operation for the pager 10 is in the stand-by mode as an automatic listening device in which a voice message is automatically received and amplified after the pager is switched from a stand-by mode to an output mode by a coded radio frequency signal. Typically, the pager generates an alert tone such as a beeping sound when the pager switches out of the stand-by mode. Voice pagers such as pager 10 are commonly used in radio paging communication systems.

The pager 10 is designed to respond to a unique set of tone bursts which are transmitted as frequency modulation impressed on an RF carrier in the UHF or VHF range. When these tones are transmitted in proper sequence, the pager emits an audible alert tone which precedes the voice message. After the voice message is completed, the user of the paging device returns the paging device to the stand-by condition and this is normally accomplished by means of a reset button or bar being depressed by the person using the pager.

In the present invention, the voice pager 10 is connected through an impedance match 12 then through a capacitor or an optional audio amplifier circuit 14 and then to a first or initiation timer circuit 16. When the initiation timer circuit 16 is triggered on, an output signal is coupled to an inverter 18 which inverter has two outputs. The first output from inverter 18 is coupled via lead 19 to a message alert tone circuit 20. The second output from the inverter 18 is coupled via lead 21 to a second or control timer circuit 22.

The control timer circuit 22 has two outputs coupled by lead 23, the first of which goes to a second inverter 24 and the second of which goes to a third inverter 26. The output of the third inverter 26 is coupled via lead 27 to a circuit 28 which is used to indicate the status of the present system. The output from inverter 26 is also coupled via lead 29 to a pager reset relay 30.

In the quiescent or stand-by mode of operation, the tape recorder is off and the pager is not providing any output. When the unique set of signals are transmitted and decoded by the pager, the pager emits an audible alert tone which precedes the voice message. The alert tone is coupled via lead 48 to the first or initiation timer circuit 16. The initiation timer circuit 16 includes, in the disclosed embodiment, a Motorola integrated circuit LM555CN timer 50 which is set to have a fifteen second "on" cycle. Specifically, the timer 50, upon receiving a low triggering signal on input lead 48, provides a transition from low to high and provides a high output to the input of the first inverter 18. Inverter 18 is part of an integrated circuit such as a Motorola MC14049UB-CP-QQB016 hex-inverter chip. Functionally inverter 18 has, as its active element, a transistor 52 such as a 2N222, NPN type transistor. The output of the first inverter 18 is taken from the collector of transistor 52 and is connected via lead 19 to the message alert tone circuit 20 and via lead 21 to the control timer circuit 22.

Thus, the output from the inverter circuit 18 is coupled to the second or control timer circuit 22 which includes as its active element, an integrated circuit LM555CN timer 54 which is set to a shorter timing cycle than the timer 50 of the initiation timer circuit 16. When the initiation timer 50 is set to a 15 second timing cycle, the second or control timer 54 will be set to a thirteen second timing cycle. More specifically, the timing cycle of the second timer 54 is set to correspond to the time allotted to the transmission of each voice message on a time shared basis by the common carrier company which is providing the message transmissions. The output signal on lead 21 from the inverter 18 insures positive activation of the timer 54 from its quiescent state to its active timing state. Thus, the control timer 54 is triggered into an active or on state concurrently with the triggering of the initiation timer 50.

Since both timers are triggered on at substantially the same time, it will be appreciated that the control timer 54 will complete its cycle or interval and time out one or two seconds before the initiation timer 50 will complete its cycle. Since the initiation timer 50 has a longer time cycle, there is a lapse or time interval between the timing out of the control timer 54 and the timing out of the initiation timer 50. This prevents false triggering or starting of the control timer 54. Hence, the present system precludes retriggering of the control timer 54 once the control timer 54 has commenced its timing cycle. It may be said, therefore, that a locking arrangement is provided which insures that the timer 54 will complete its full cycle, once actuated or triggered.

During the "on" or timing cycle of timer 54 a high logic signal is provided on lead 23 to both the second inverter circuit 24 and the third inverter circuit 26. Inverter circuits 24 and 26 are part of the aforementioned hex inverter chip. The input to the third inverter from the second or control timer circuit 22 is inverted to provide a low output signal through the use of an active element such as a transistor 56 of the 2N222-NPN type, with the output being taken on lead 27 to the status circuit 28. The status circuit 28 includes an IC such as a CD4011BCN driver 58 to drive the LED 60 which provides a visible signal when a message is being received by the pager 10. The driver 58 functions to drive LED 62, which may be one color such as green, to indicate that the system is "on" and ready to receive a message, and to drive LED 60, which may be another color such as red, to indicate that a message has been received. The use of two differently colored indicators functions to advise the user of the system that the system is functioning properly (LED 62) or that a message has been received.

The output from the third inverter 26 is also connected by lead 29 to the reset relay 30. The relay 30 is coupled via leads 64, 66 back to the pager 10 and, as will be explained later, the purpose of the relay 30 is to automatically reset the pager, i.e., return the pager to its stand-by condition, at the conclusion of a message interval.

The output from the timer 54 of the control timer circuit 22 is also coupled as previously explained, by lead 23 to the second inverter circuit 24 which inverter includes, as its active element, a transistor 68 such as a 2N222-NPN type transistor. The transistor 68 inverts the high signal from the timer 54 to a low signal which is coupled on lead 70 to couple ground to the tape recorder from the battery 72. Thus, during the time that there is a high signal on lead 23 (i.e., while the second timer 54 is on) the ground side of the power circuit is coupled to the tape recorder and thus the power circuit is complete. Power is actually connected to the tape recorder via a plug and jack connector 74, or alternatively by a direct connection. In addition, the output from the collector of transistor 68 on lead 33 energizes the message alarm relay circuit 34 which provides, as an optional feature, the generation of an audible signal from the transmitter 36 to indicate that a message is being recorded.

The audible signal from the transmitter 36 may be received by a portable receiver. It is contemplated, within the spirit and scope of the present invention, that a non-voice receiver may be carried by the user of the present system so that the user is aware that a message is being received and recorded even though the user is at a remote location from the pager itself. Thus, for example, the present invention including the pager 10 may be left locked in a vehicle and, the user of the system may carry a portable receiver which emits a tone in response to a signal from transmitter 36 to indicate that a message is being recorded. In this fashion, the user of the system will be aware that a message has been transmitted so that the user can return to the vehicle and play the message which has been recorded on the tape recorder 38.

As previously described, there are two outputs taken from the first inverter circuit 18 and more particularly from the collector of the transistor 52. One such signal was via lead 21 and the second signal is on lead 19 and is coupled through a resistor to the message alert tone circuit 20. This circuit 20 includes, as its active element, a transistor 78 preferably a type 2N222-NPN transistor coupled as an audio amplifier to generate a signal which powers a transducer 80 such as a Piezo electric tone transducer. Alternatively, circuit 20 may be a buzzer such as a Star Micronics Series MMB-01. The message alert tone circuit 20 provides an audible tone to indicate that a message is being received. The tone from the transducer 80 is local in nature, i.e., it is audible in the vicinity of the system, as contrasted to the transmitter 36 which produces a tone which may be received at a remote location.

Figure 2:
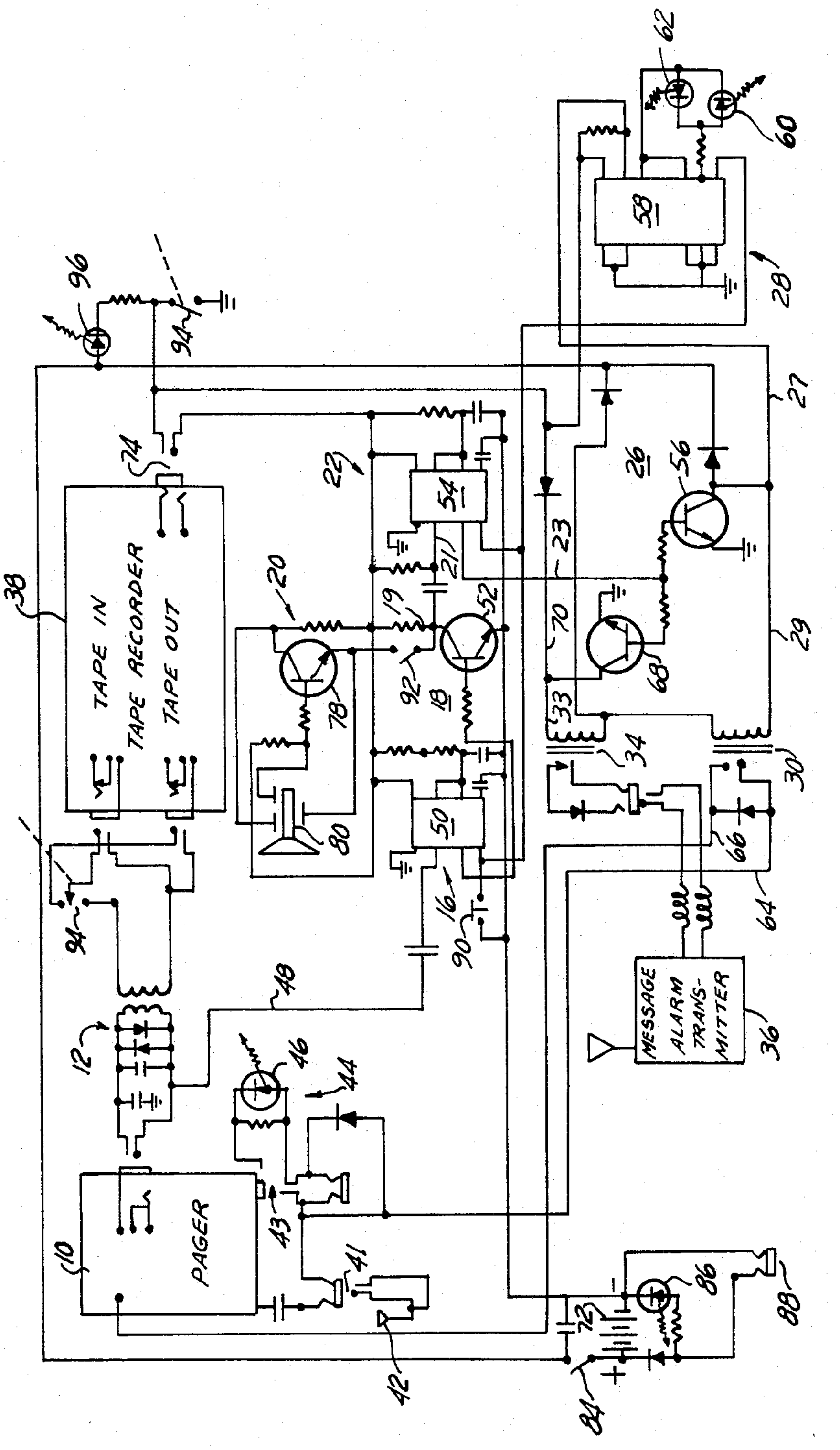
FIG. 2 is a detailed schematic diagram of the present invention.

Prior to explaining the operation of the circuit of FIG. 2, several additional components will be first explained. The system of the present invention includes a main on-off switch 84 which functions to turn power on and off to the entire system. Thus, with switch 84 closed, either LED 60 or LED 62 will be illuminated. The circuit includes an LED 86 which is illuminated when the system is charging the jack and plug type connector (only the jack 88 is illustrated) to permit external recharging of the battery 72.

A double pole double throw three position momentary off-on switch is provided which switch includes a first momentary switch portion 90 coupled between ground and the timer 50 of the initiation timer circuit 16. The function of this switch portion 90 is to permit external reset of the entire system. The other portion 92 of this double pole double throw three position switch is between the collector of transistor 52 of the first inverter 18 and the emitter of transistor 78 of the message alert tone circuit 20. The function of this portion of the switch is to permit completely by-passing the local alert tone from the message alert tone circuit 20.

Switch 94 is a double pole double throw two position switch; in a first position, the internal microphone on the tape recorder is enabled to permit dictating onto the tape recorder and in the second position the system is operational so that the tape recorder records messages from the pager 10. An LED 96 is provided and the LED 96 is illuminated when switch 94 is in position to permit dictating onto the tape recorder.

The complete operation of the circuit of FIG. 2 will now be explained. When the pager 10 is addressed by the unique coded tone sequence associated therewith, the alert tone from the pager is coupled to the initiation or first timer 16. Timer 16 starts a timing cycle such as a fifteen second cycle. The timer also provides an output to the first inventer 18. From the inverter 18 there are two output signals: one of the output signals is coupled to the message alert tone circuit 20 to provide an audible tone that a message is being recorded. The second output signal starts the control timer circuit 22 which provides a shorter duration timing cycle which corresponds to the alotted duration of messages on a time shared basis.

The output from the control timer circuit 22 through inverter 26 turns on the LED 60 indicating that a message is being recorded and latches on the reset relay circuit 30. The output from the control timer circuit 22, through inverter 24, couples ground to the tape recorder and powers the relay 34. If the external message system is included in the particular system then an externally generated, remotely received signal is provided from the transmitter 36.

As is conventional, after the tone signal is received by the pager 10, the pager 10 switches from its stand-by mode to its operating mode and the message is coupled through the impedence matching circuit 12 to the input side of the tape recorder 38. Since power and ground are being supplied to the tape recorder, the tape recorder is operative to record the message.

At the conclusion of the timing cycle of the second or control timer circuit 22 and particularly the timer 54 associated therewith, the output of timer 54 goes low thus causing inverters 24 and 26 to go high. Inverter 24 going high opens the circuit between the battery ground and the tape recorder thus the tape recorder stops. Inverter 26 switching to a high state causes driver 58 to de-energize LED 62 and energize LED 60 to indicate that a message has been received. At the same time, relay 30 is de-energized and thus a signal through leads 64 and 66 rests the pager back to its stand-by condition. This signal on leads 64 and 66 provides the equivalent of manually resetting a pager back to its stand-by condition. There is a time lapse or time interval after the second or control timer 54 times out before the initiation timer 50 times out. Then, the initiation timer times out and the entire system is in its quiescent or stand-by mode awaiting the next message.

Figure 3:
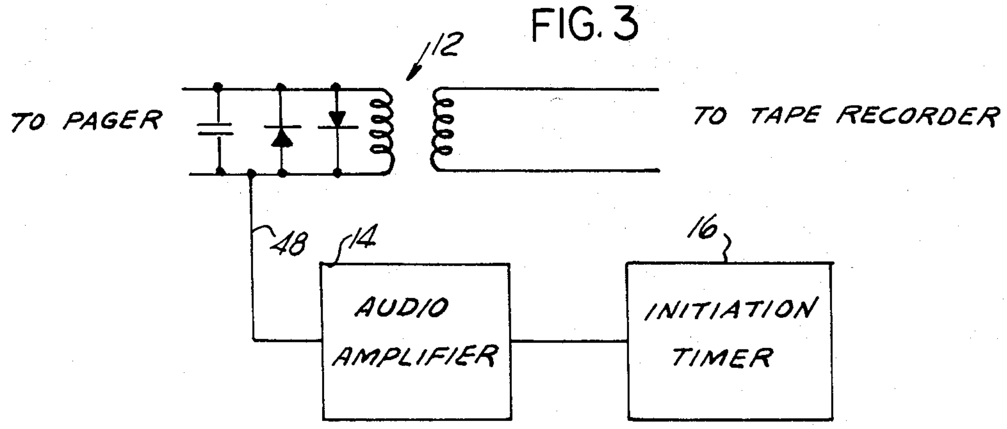
FIG. 3 illustrates a modification of the schematic diagram of FIG. 2.

Reference should now be had to FIG. 3 for a description of the optional audio amplifier circuit. When the radio pager is a Motorola Spirit, the audio amplifier stage is not required. However, when other radio pagers are used, an audio amplifier stage or circuit 14 should be interposed between the impedence match circuit 12 and the first or initiation timer circuit 16. The preferred audio amplifier circuit would be an NPN transistor such as a type 2N222 transistor having the input to the transistor at its base from the impedence match circuit 12 and the output of the transistor taken from its collector to the timer 50 of the first timer circuit 16. Thus, the audio amplifier would be interposed in lead 48 of the embodiment illustrated in FIG. 2.

The present invention has been described in its preferred form. It will be apparent that many changes and modifications may be made without departing from the spirit and scope of the present invention. The invention, therefore, should be limited only by the following claims.

What is claimed is:

1. A control circuit for interconnecting a radio actuated portable voice pager or the like with a record-playback recorder, the pager operative in a stand-by condition to receive and respond to coded tones from a transmitter to provide an alert pager activating signal which precedes a radio transmitted voice message, said radio transmitted voice message being allotted a defined message time period, said circuit comprising:

an initiation timer;

means operative to couple the alert pager activating signal to the input of said initiation timer means to trigger said initiation timer on;

said initiation timer operative to time-out after the completion of a first predetermined time cycle interval;

control timer means;

means coupling the output of said initiation timer to the input of said control timer means, said coupling means converting the output of said initiation timer into a one-time signal for triggering said control timer means on such that said control timer means starts its predetermined time cycle interval substantially concurrently with said initiation timer time interval;

said control timer means having a second predetermined time cycle interval which is of shorter duration than the duration of the first predetermined time cycle interval;

said second time cycle corresponding to the defined message time period; and logic means receiving the output from said control timer means for controlling relay means for operating the recorder to record the message being received by the pager only during said control timer means interval, said logic means further operative, upon said control timer means timing out, for resetting the pager to its standby condition.

2. The invention as defined in claim 1 wherein said logic means further provide an audible tone indicating that a message has been received.

3. The invention as defined in claim 1 wherein said logic means further powers a second transmitter to generate a second audible signal when the alert pager activating signal is received by said pager.

* * * * *

UNITED STATES PATENT AND TRADEMARK OFFICE

CERTIFICATE OF CORRECTION

PATENT NO. : 4,499,567

DATED : February 12, 1985

INVENTOR(S) : Carl R. Armstrong

It is certified that error appears in the above-identified patent and that said Letters Patent is hereby corrected as shown below:

Inventor's address should read
-- 8386 Homer, Detroit, Michigan 48209 --.

Signed and Sealed this

*Twenty-seventh* Day of *May 1986*

[SEAL]

*Attest:*

DONALD J. QUIGG

*Attesting Officer* *Commissioner of Patents and Trademarks*